United States Patent Office 3,478,356
Patented Nov. 11, 1969

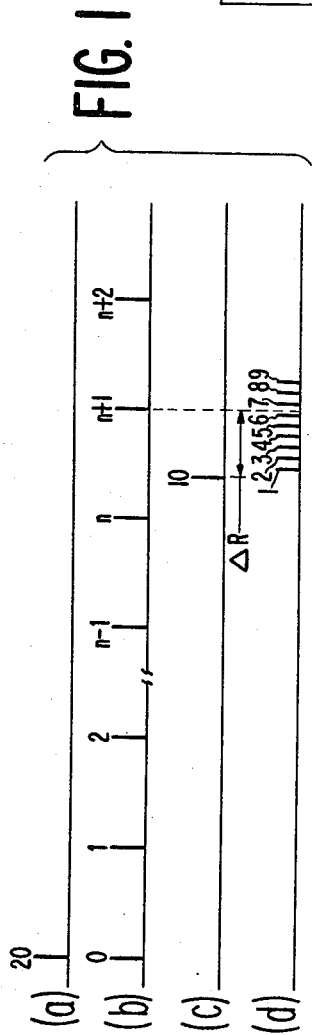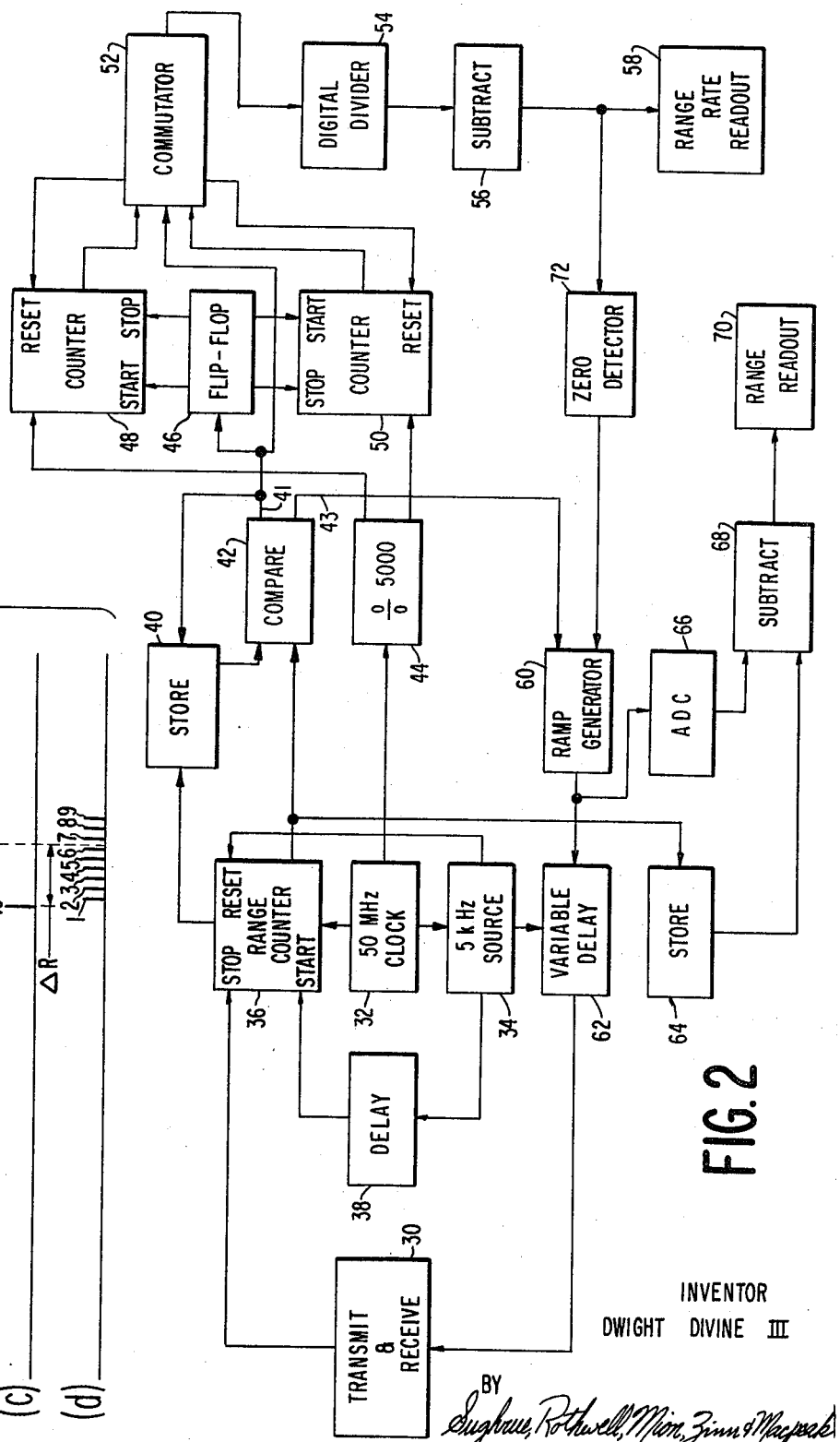

3,478,356
RANGE RATE RADAR
Dwight Divine III, Wheaton, Md., assignor to International Business Machines Corporation, a corporation of New York
Filed July 10, 1968, Ser. No. 743,680
Int. Cl. G01s 9/44
U.S. Cl. 343—8                                7 Claims

ABSTRACT OF THE DISCLOSURE

A radar range rate measuring system that measures the time it takes a target to travel between fixed range markers, represented by generated marker pulses. A relatively high transmitted pulse repetition frequency results in a plurality of transmitted and received pulses during movement of the target between adjacent range markers. The times at which the received pulses come closest to the range markers is detected by detecting a changeover in the range marker readout. A time measurement between changeovers provides an accurate measurement of time per fixed distance, or inversely, of range rate.

Background of the invention

The present invention is in the art of systems for measuring the rate of change of range of distant objects.

Digital systems for measuring range rate operate in the prior art basically by making a pair of range measurements, separated by a fixed amount of time, and dividing the difference in range by the fixed amount of time in order to provide a range rate measurement. The range measurements are made by generating marker pulses and counting the generated marker pulses which occur in between the transmitted and received pulses. The range marker pulse generator is preset so that each range marker pulse represents a fixed interval of distance to the target. The resolution of such distance is only as good as the smallest range marker interval. For example, for an echo pulse received anywhere between the occurrence of the Nth and the $N+1$ range marker pulse, the system reads out a range corresponding to the $N+1$ range marker. The difference between actual range and the $N+1$ reading is the range error due to quantization. Since two range readouts are subtracted to provide a range rate, the larger the number of range markers which the target passes in between the two readouts, the greater the accuracy of the system. Thus, the higher the velocity of the target the better the accuracy of the system, and conversely, the lower the velocity of the target, the worse the accuracy of the system.

Summary of the invention

In accordance with the present invention, a digital range rate measuring system is provided which has increased accuracy at lower velocity rates of the target. Thus, such a system is especially adapted for use in measuring the range rate of targets during such operations as landing and docking, when the target has a low velocity relative to the range measuring apparatus. Note that the range measuring apparatus may be on the ground or, in the case of docking, may be on a mother ship.

Range marker pulses are generated by a marker pulse generator and provide a fixed interval of distance between each pair of marker pulses. The pulse repetition frequency of the transmitted pulses is sufficiently high for the expected range of target velocities such that a plurality of echo pulses will be received during the time that the target passes from one range marker to the next range marker. For each transmitted pulse the range marker pulses are counted, similar to the prior art systems, but unlike the prior art systems the time of the receipt of the echo pulse is noted only when the range marker readout changes. This time is substantially a measure of the instant when the target passes a position in space corresponding to a range marker. These times are referred to hereafter as crossover times or crossovers. The distance between crossovers is fixed by the setting of the range marker pulse generator and the time between crossovers is a measurement of the time it takes for the target to travel the fixed distance. This time is divided into the fixed distance to provide a range rate indication.

An additional feature of the present invention adds an artificial or apparent velocity to the target by substantially linearly varying the delay time between the transmitted pulse and the range marker pulses. The purpose of the artificial velocity is to prevent the time measurement between crossovers from being unduly prolonged when the target is approaching zero velocity. After the range rate is determined, the artificial velocity is subtracted therefrom to provide an accurate range rate.

Brief description of the drawings

FIGURE 1 is a timing diagram which illustrates the difference in operation between the present invention and the prior art.

FIGURE 2 is a block diagram of a preferred embodiment of the present invention.

Detailed description of the drawings

Figure 3:
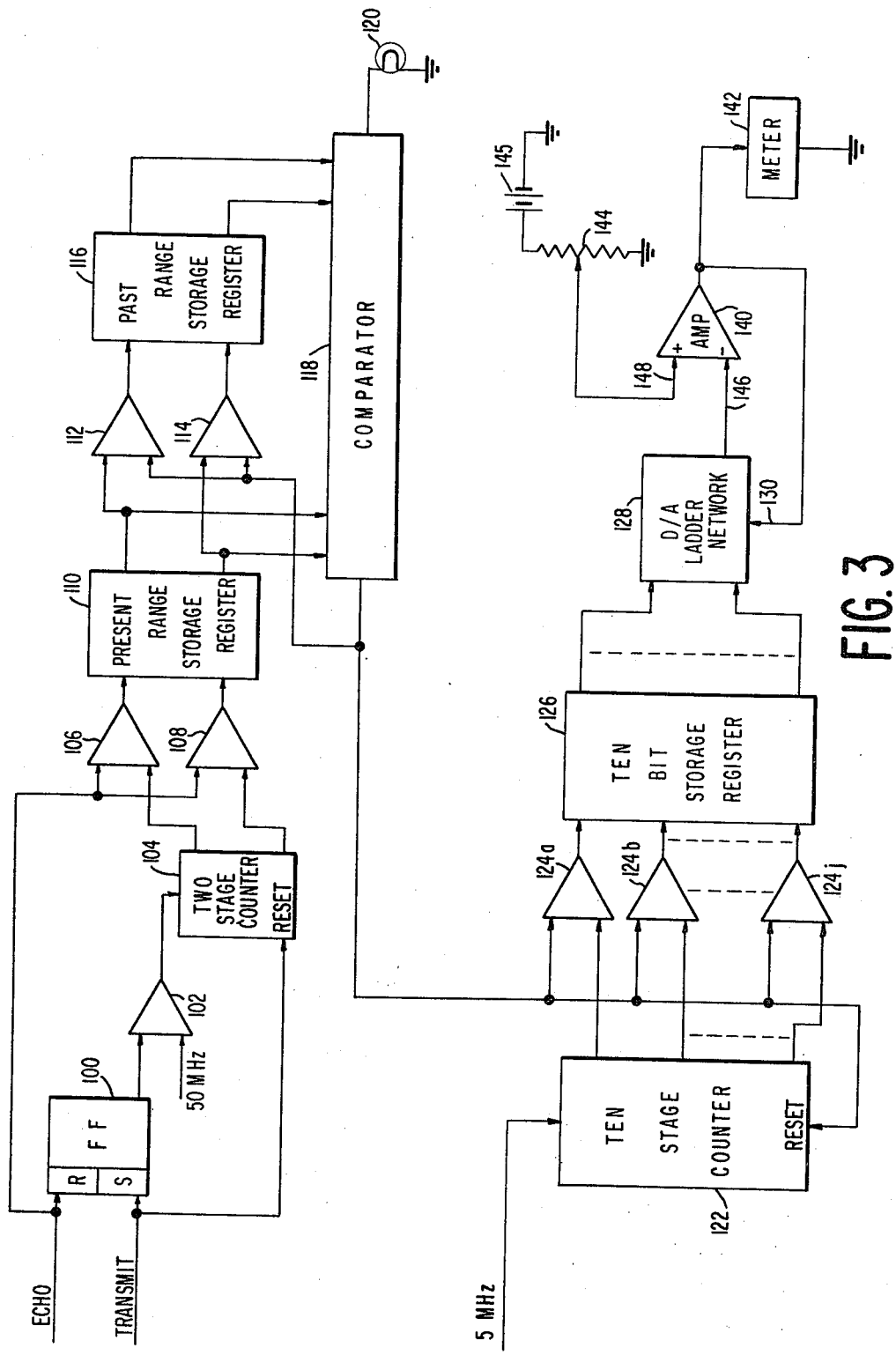
FIGURE 3 is a block diagram of an alternate embodiment of the present invention.

In FIGURE 1, waveform $a$ represents the transmitted pulse and waveform $b$ represents the range marker pulses which are generated in response to the transmitted pulse. In the specific embodiment described herein, the pulse repetition frequency of the marker pulse generator is approximately 50 mHz., corresponding to a 20 nanosecond pulse separation, which, in turn, corresponds to a ten-foot range separation. Thus, the distance between each range marker pulse represents 10 feet. The range marker pulses are labeled 0 through $N+2$ corresponding to the number of ten-foot intervals to the target. In the prior art systems, if an echo pulse 10 is received at a time indicated in waveform $c$, the system waits until the occurrence of the next range marker pulse to provide a range output indication. The range output indication in this case would be $(N+1)$ x 10 feet. A subsequent range measurement would be made in the same manner resulting in a second range output reading. The two range mark readings would then be subtracted and divided by the time between readings. As can readily be seen by waveform $c$, the maximum range error $\Delta R$ is equal to the range marker interval. If the target was travelling slow enough so that it only crossed a single range marker during the time between range measurements, the range rate or velocity error $\Delta V$ could be 100% inaccurate. On the other hand, if the target was travelling fast enough to cross a large number of range markers in between the two range measurements, the accuracy of the range rate measurement would be greatly increased.

In accordance with the present invention, the transmitted pulses are sent out at a relatively high repetition rate and the received echo pulses will therefore occur at only slightly different times relative to the range marker pulses due to the target velocity. The received echo pulses resulting from an equal plurality of transmitted pulses are received at times indicated in waveform $d$ of FIGURE 1. There are nine echo pulses illustrated in waveform $d$.

In between the time of the first transmitted pulse and the first received echo pulse, a range mark counter counts N range mark pulses. In between the time of the second transmitted pulse and the second received echo pulse, the range mark counter also counts N range mark pulses. This occurs through the sixth transmitted and received pulses. The relative time difference of the nine received echo pulses with respect to the range marker pulses is a result of the target moving at a negative velocity (further away from the measuring system). Between the sixth and the seventh received echo pulses, the target will have passed a point in space corresponding to range marker $N+1$. Thus, during the time between the seventh transmitted pulse and the seventh received echo pulse, the range marker counter will count $N+1$ range marker pulses. This changeover or crossover from N to $N+1$ is detected by the apparatus of the present invention and is identified by an output pulse representing a range marker crossover. The system continues to operate in the same manner until the next output pulse corresponding to a second range crossover occurs. The distance traveled between crossovers is fixed, and the time duration between crossovers is a measure of the time it takes the target to travel the fixed distance.

If $t_m$ = time between crossovers in seconds;
$\Delta R$ = range error;
V = target velocity in feet per seconds;
$\Delta V$ = velocity error;
$L_c$ = range marker distance in feet; and
F = pulse repetition frequency of the transmitter in pulses per second.

Then the following applies $\Delta R = V/F$
$\Delta V = \pm \Delta R / t_m$
$t_m = L_c / V$
$\Delta V = \pm V^2 / F L_c$ From the last equation it can be seen that the accuracy increases as the velocity decreases and the time between measurements increases. If increasing measurement time is a problem, such as when measurements are made on a target approaching zero velocity, an artificial velocity can be added at the transmitter by monotonically delaying the transmitted pulses. By substantially linearly increasing or decreasing the delay, the received echo pulses occur in time as if the target had an artificial velocity added to it. Thus, if the target were actually standing still it would appear to have a velocity equal to the artificial velocity and crossovers would still occur despite the absence of movement of the target.

In the apparatus shown in FIGURE 2, there is included a means for generating range marker pulses which may comprise a 50 mHz. clock pulse generator 32. The output of the clock pulse generator 32 is connected to a range counter 36, a divide by 5,000 circuit 44, and a transmitter pulse generator which may comprise a 5 kHz. source 34. The range marker pulses synchronize the 5 kHz. source 34. The output pulses from the source 34 are applied to a transmit and receive unit 30, which transmits the pulses from source 34 and receives echo pulses which are reflected from the target. For the present, variable delay circuit 62 will be ignored since it is only used when it is desired to provide an artificial velocity to the target.

The output pulses from source 34 are also applied via a delay 38 to the start input of range counter 36. The delay time of delay means 38 is set to compensate for the system propagation delay. Upon receipt of a pulse at the start input terminal, the range counter 36 begins counting the range marker pulses from the clock source 32. It will be noted that the range counter is also reset by the outputs from source 34 and thereby registers a count of zero when a pulse is applied to the start input terminal thereof.

When an echo pulse is received by the transmit and receive unit 30, it is applied to the stop input terminal of the range counter 36. Thus, the range counter accumulates the range marker pulses in between the transmitted and received pulses.

The range counter output is applied as one input to a digital compare circuit 42, which may be any type of digital comparison circuit well known in the art. The other input to the digital compare circuit 42 is from a digital storage circuit 40. If the two input digital values are not equal, the digital compare circuit 42 provides an output pulse on output line 41. The latter output pulse represents a range marker crossover. In response to the crossover output pulse on lead 41, the digital value presently in the range counter is entered into the storage circuit 40. Thus, after each received pulse, the range marker count stored in the range counter is compared with the previous range marker count stored in the storage circuit 40. If there has been no change in the range marker count, there is no output from the compare circuit 42 and the contents of storage circuit 40 remains the same. If there is a change in the range marker count, indicating a crossover, the compare circuit 42 will provide an output and the storage circuit 40 will be updated.

The output from compare circuit 42 also triggers a JK type flip flop 46 which controls a pair of identical counters 48 and 50. The flip flop 46 controls the counters 48 and 50 such that one is stopped while the other is counting. Both counters 48 and 50 are fed with clock pulses from the divide by 5,000 circuit 44. The latter circuit receives inputs from 50 mHz. clock pulse generator 32 and provides clock pulses to the counters 48 and 50 at a frequency of 1 kHz. Each time the flip flop 46 is triggered by an output pulse from compare circuit 42 the functions of counters 48 and 50 are switched. Thus, in between output pulses from compare circuit 42, representing a pair of crossovers, one of the counters, such as counter 48, accumulates the 1 kHz. clock pulses. When the counter is stopped by the flip flop 46 being triggered, it contains a count proportional to the time ($t_m$) it took the target to travel between a pair of range markers. The digital count in the counter is then connected to a digital divider 54 by a commutator 52. The commutator may, for example, be a relay device which is switched under control of the output pulses from compare circuit 42. When counter 48 is counting and counter 50 is stopped, the commutator 52 passes the digital count in counter 50 to the digital divider 52 and resets counter 50. When counter 50 is counting and counter 48 is stopped, the commutator 52 passes the digital count in counter 48 to the digital divider 52 and resets counter 48. The function of the digital divider 54 is to divide the time, $t_m$, as represented by the digital input thereto, into a fixed digital value representing the distance between range markers. The output of the digital divider 54 which is a digital value representing the velocity of the target is applied to a range rate readout circuit 58 which displays the range rate output value. The subtract circuit 56 is only used if the system includes apparatus for adding an artificial velocity to the actual target velocity.

The additional apparatus provided for adding an artificial velocity includes a ramp generator 60, a variable delay means 62, a subtract circuit 56 and a zero detector. The ramp generator 60 may comprise a standard saw tooth generator plus an inverter. The increasing ramp voltage is applied directly to the variable delay means 62 to provide a linearly increasing delay and is inverted and applied to the delay means to provide a decreasing delay. A variable delay means 62 may be any type of variable delay circuit, many of which are well known in the art, which delays an input pulse, an amount dependent upon the voltage level applied to the control input terminal. In the specific embodiment described herein the maximum level of the ramp generator output is set to correspond to a delay equal to 20 nanoseconds, which is the spacing between marker pulses. Thus, the artificial velocity added to the actual target velocity depends upon the slope of the ramp voltage but the maximum artificial range either added to or subtracted from the actual range corresponds to a single range marker interval or ten feet. It will be noted that the pulses from source 34, which correspond to the transmitted pulses, are delayed by the variable delay means 62 before being applied to the tranmit and receive circuit 30. Thus, the variable delay means 62 provides a relative delay between the range marker pulses and the transmitted pulses. Since the slope of the ramp is preset, the amount of the artificial velocity is known and this amount is subtracted from the output of digital divider 54 in a digital subtraction circuit 56.

As pointed out above, the purpose of the artificial velocity is to decrease the time between crossovers. In order to do this, it is necessary that the artificial velocity be in the same direction as the real velocity. Thus, if the target is moving in a direction of increasing range (negative velocity) a negative velocity must be added. This is done by connecting the ramp voltage directly to the variable delay means 62 to provide an increasing delay. Note that an increasing delay displaces the receive echo pulses in a direction towards increased range. On the other hand, if the target is moving in a direction of decreasing range (positive velocity) the inverted ramp should be applied directly to the control input of variable delay means 62, thereby providing a decreasing delay in the transmitted and received echo pulses. If the artificial velocity is in the opposite direction of the real velocity, the combination of artificial and real velocity may add up to zero. In order to prevent this from happening, the output of ramp generator 60 is selected in accordance with the following method.

The compare circuit 42 not only provides an output on line 41 indicating that a crossover has occurred, but also provides an output on line 43 indicating which of the two input digital values is the greatest. If the digital input from range counter 36 is the greatest, thereby indicating that the target is moving in a direction of increasing range, the compare circuit 42 provides a positive output on line 43. On the other hand, if the digital input from range counter 36 is less than that from storage circuit 40, the compare circuit 42 provides a negative output on line 43. The output line 43 is connected to ramp generator 60. Also connected to ramp generator 60 is the output from a zero detector 72 which senses the range rate input to the readout circuit 58. When the range rate reaches zero the zero detector 72 detects this condition and generates an output pulse which is connected to the ramp generator 60. In response to an output from zero detector 72 and a positive output on line 43, the positive going ramp voltage is selected and applied directly to the variable delay circuit 62. On the other hand, if the output from zero detector 72 occurs in coincidence with a negative output on line 43, the inverted ramp voltage is selected and applied directly to the control input of the variable delay means 62.

If it is desired to provide a range readout as well as a range rate readout, the system may also include a second storage means 64, a simple analogue to digital converter 66, a digital subtract circuit 68 and a range readout circuit 70. As mentioned above, the variable delay means 62 adds a maximum artificial range equal to one range marker interval. The instantaneous range error will depend upon the magnitude of the ramp voltage. The range readout circuitry operates to subtract the digital value 1 (corresponding to one range marker interval) if the input voltage to the variable delay means 62 is above the medium portion of the ramp voltage slope. Nothing will be subtracted from the range reading if the input to the variable delay means 62 is on the lower portion of the slope. The ramp voltage, or inverted ramp voltage, whichever is applied to the variable delay means 62, is applied to the analogue to digital converter 66 which provides a digital zero output if the input value is below the middle value of the slope and a digital one output if the input amplitude is above the middle value of the slope. This value (0 or 1) is subtracted from the range reading in range counter 36. The range reading in range counter 36 may be applied to a storage circuit 64 prior to being applied to the subtract circuit 68. The output from subtract circuit 68 is applied to a range readout circuit 70 which displays the range.

FIGURE 3 shows an alternate embodiment of the present invention which uses only a single counter for counting clock pulses in between crossovers and uses an analogue divider for dividing the detected value $t_m$ into the fixed distance interval. The system shown in FIGURE 3 also does not include means for adding an artificial velocity to the actual target velocity.

In FIGURE 3, the transmit pulses or pulses corresponding in time with the transmit pulses are applied to the set input terminal of a set-reset flip flop 100. The flip flop 100 is reset by echo pulses which are applied to the reset input terminal thereof. The output from flip flop 100 is thus a gate pulse having a duration equal to the time between transmitted and received pulses. The output gate pulse is applied as one input to the AND gate 102; the other input to AND gate 102 being the 50 mHz. range marker pulses. During the time between transmit and receive pulses, the range marker pulses are passed through gate 102 to a two-stage binary counter 104. The two-stage binary counter 104 is reset by the transmit pulse or other pulse corresponding in time with the transmit pulse. It will be noted that a two-stage binary counter counts 00, 01, 10, 11, 00, etc. Thus, although the range marker pulses are counted by the counter 104 they are not accumulated thereby. However, as will be apparent to anyone of ordinary skill in the art, it is not necessary that the range marker pulses be accumulated since the range rate rather than the absolute range is the quantity to be detected.

When the echo pulse is received, flip flop 100 is reset and AND gate 102 becomes blocked. Also, the echo pulse is applied to the upper input of AND gates 106 and 108. The lower inputs of AND gates 106 and 108 are connected to the output terminals from the two-stage binary counter 104. Thus, upon receipt of the echo pulse the contents of counter 104 is transferred into a present range storage register 110. A digital comparator 118 compares the contents of the present range storage register 110 with the contents of a past range storage register 116. If there has been no crossover since the last transmitted and received pulses the two inputs to the comparator 118 will be identical. However, if a range crossover has occurred the digital value stored in the present range storage register 110 will be different than the digital value stored in the past range storage register 116. When such condition occurs, the comparator 118 provides an output, hereafter referred to as the crossover output, which represents the time at which the taget passes a point in space corresponding to a range marker. The crossover output pulse energizes a pair of AND gates 112 and 114 to pass the contents of the present range storage register 110 into the past range storage register 116. A second output from comparator 118 and a lamp 120 may be provided to indicate a negative velocity when the values compared by comparator 118 are such as to indicate that the target is travelling in a direction of increasing range.

The crossover output from comparator 118 is also applied to each one of ten AND gates 124a through 124 and to the reset input terminal of a ten-stage binary counter 122. The ten-stage binary counter 122 receives 5 mHz. clock pulses and accumulates them in between receiving the crossover pulses. A delay may be provided to insure that the ten-stage binary counter 122 is fully read out by the AND gates 124a through 124j prior to being reset by the crossover pulse. The number of pulses accumulated by the ten-stage counter 122 provides a measurement of time, $t_m$, between crossover pulses. The digital value corresponding to the time, $t_m$, is applied to a ten bit storage register 126 which holds the digital value corresponding to $t_m$ and supplies it in parallel on ten output terminals to a digital to analogue converter with ladder network 128.

Digital to analogue converters with ladder networks are well known in the art. The output of such a circuit is equal to $K_n \cdot e_0$, where $K_n$ is the ratio of the digital input to the maximum digital number (for a ten bit ladder network the maximum number is 1023), and $e_0$ is the reference voltage applied to the ladder network. As indicated in FIGURE 3, the reference voltage is applied to the ladder network via input line 130. In the digital to analogue converter 128 of the present invention, the reference voltage is not fixed but is obtained from the output of a high gain D.C. differential amplifier 140 whose inputs are a fixed reference applied to input terminal 148, and the output of the ladder network, which is applied to input terminal 146. If $K_a$ is the open loop gain of amplifier 140, and $e_{ref}$ is the input reference voltage derived from potentiometer 144 and voltage source 145, then the output $e_0$ of the amplifier 140 is defined by the following equation:

$$e_0 = K_a(e_{ref} - K_n e_0)$$

The above becomes:

$$e_0(1 + K_n K_a) = K_a e_{ref}$$

If $K_n K_a$ is much greater than 1, then:

$$e_0 = e_{ref}/K_n$$

By using the proper value of $e_{ref}$, the D.C. voltage output applied to a meter 42, will be directly proportional to the range rate of the target.

While the invention has been particularly shown and described with reference to a preferred embodiment thereof, it will be understood by those skilled in the art that various changes in form and details may be made therein without departing from the spirit and scope of the invention.

What is claimed is:
1. A range rate measuring apparatus for providing a measure of range rate of a distant target comprising,
    (a) means for transmitting and receiving pulses of energy to and from a distant target
    (b) means (responsive to the transmission of pulses) for generating range marker pulses representing range marks in space,
    (c) means for detecting when the target passes a range marker and for providing an output pulse representing range marker crossover each time the target passes a range marker, and
    (d) time measuring means responsive to said last mentioned output pulses for measuring the time between said output pulses.
2. A range rate measuring system as claimed in claim 1 further comprising, dividing means for dividing the range corresponding to the distance between said range markers by said measured time.
3. A range rate measuring system as claimed in claim 2 wherein said means for detecting and providing comprises,
    (a) range marker counting means for counting the range markers generated between each transmitted and corresponding received pulse, thereby providing a range marker count corresponding to each transmitted pulse, and
    (b) means responsive to said range marker counts for providing said output representing range marker crossover when said range marker count changes.
4. A range rate measuring apparatus as claimed in claim 3 wherein said time measuring means comprises,
    (a) clock pulse generator, and means for counting the number of clock pulses generated by said clock pulse generator between said outputs representing range marker crossover.
5. A range rate measuring apparatus as claimed in claim 4 further comprising,
    (a) means for substantially linearly varying the relative times of said transmitted pulses and said range markers, whereby an apparent velocity is added to said target velocity, and
    (b) means for subtracting said apparent velocity from the output of said dividing means.
6. A range rate measuring system as claimed in claim 5 wherein said means for providing said output representing range marker crossovers comprises,
    (a) digital comparator means, adapted to receive first and second digital input values for providing an output in response to a non-equality between said input values,
    (b) means for applying said range count in said range mark counter as said first digital input value to said digital comparator,
    (c) a digital storage register, the contents of said digital storage register being applied to said digital comparator as said second digital input value, and
    (d) means responsive to said output from said digital comparator for transferring the count in said range mark counter to said digital storage means.
7. A range rate measuring apparatus as claimed in claim 6 wherein said means for varying comprises,
    (a) ramp generator means for generating a ramp voltage
    (b) variable delay means having said ramp voltage connected thereto for variably delaying, in dependence upon said ramp voltage magnitude, said transmitted pulse, and
    (c) means for varying the polarity of the slope of said ramp voltage.

References Cited
UNITED STATES PATENTS

| | | | |
|---|---|---|---|
| 2,885,668 | 5/1959 | Eaton | 343—9 |
| 3,078,457 | 2/1963 | Himler et al. | 343—8 X |
| 3,246,324 | 4/1966 | Price | 343—5 |
| 3,377,587 | 4/1968 | Nakahara et al. | 343—7 |

RODNEY D. BENNETT, Jr., Primary Examiner

H. C. WAMSLEY, Assistant Examiner

U.S. Cl. X.R.

343—9